Feb. 21, 1933.                 C. H. SHARP                    1,898,219
                      APPARATUS FOR THE MATCHING OF COLORS
                         Filed Sept. 6, 1929        3 Sheets-Sheet 1
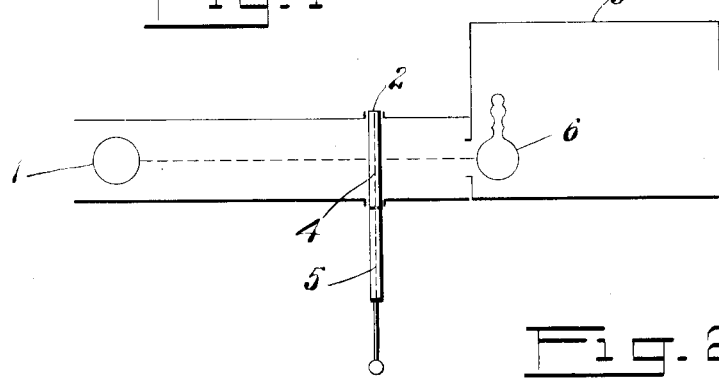
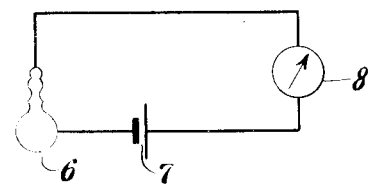
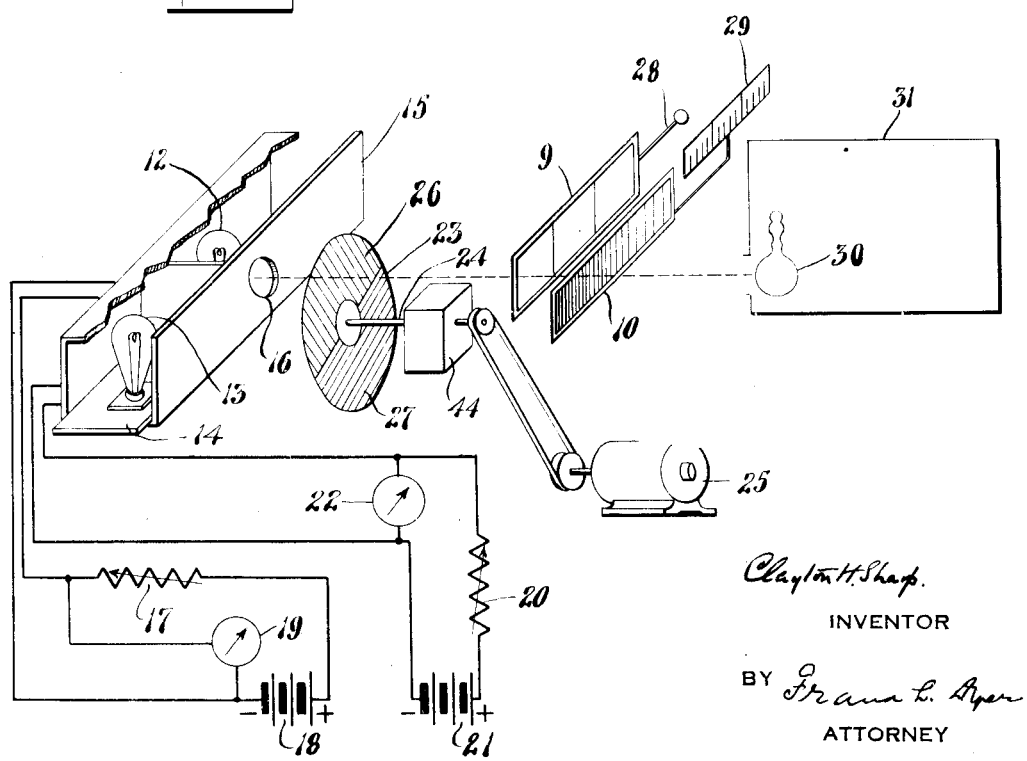
Clayton H. Sharp.
INVENTOR
BY Frank L. Dyer
ATTORNEY Feb. 21, 1933.   C. H. SHARP   1,898,219
APPARATUS FOR THE MATCHING OF COLORS
Filed Sept. 6, 1929   3 Sheets-Sheet 2
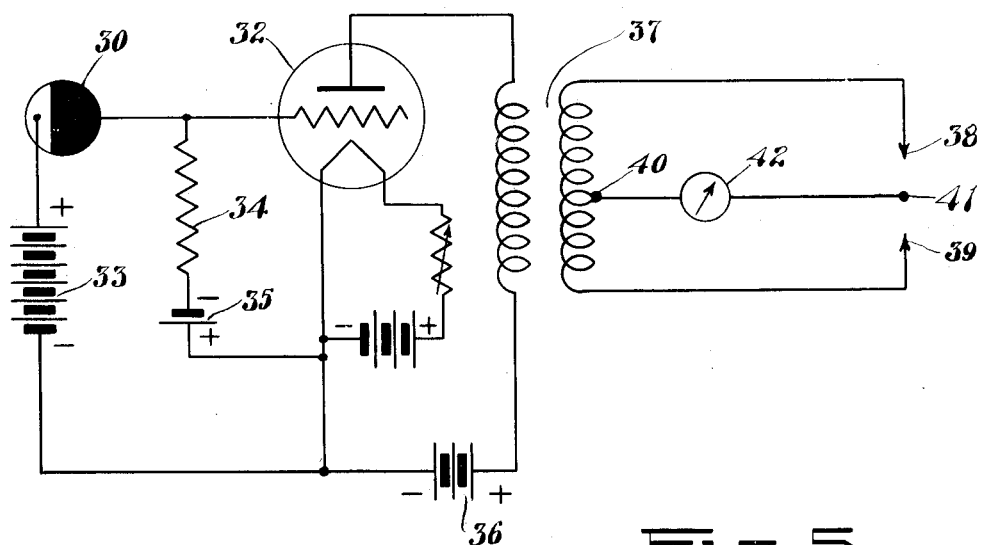
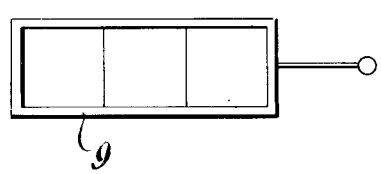
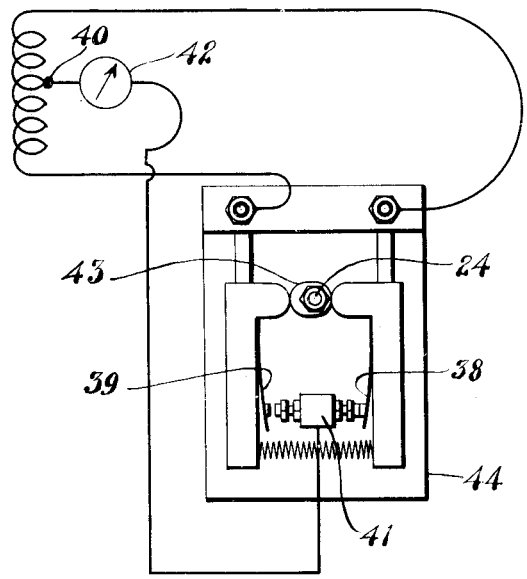
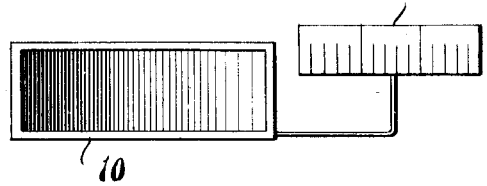
Clayton H. Sharp.
INVENTOR
BY
ATTORNEY Feb. 21, 1933.         C. H. SHARP              1,898,219
            APPARATUS FOR THE MATCHING OF COLORS
                Filed Sept. 6, 1929      3 Sheets-Sheet 3
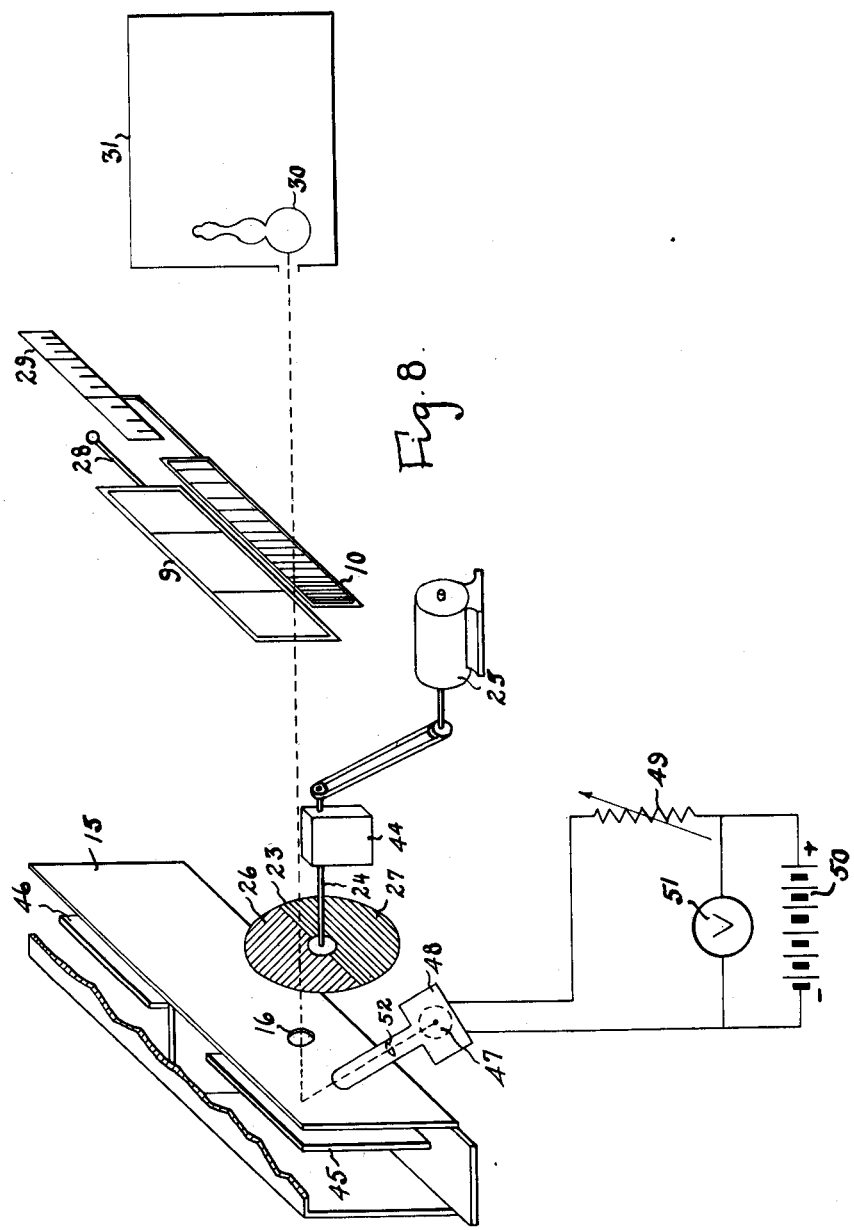
INVENTOR
Clayton H. Sharp
BY his ATTORNEYS Darby & Darby.

UNITED STATES PATENT OFFICE

CLAYTON H. SHARP, OF WHITE PLAINS, NEW YORK

APPARATUS FOR THE MATCHING OF COLORS

Application filed September 6, 1929. Serial No. 390,710.

My invention is susceptible of many useful applications, among which may be mentioned the determination of the color and hence the temperature of incandescent bodies such as incandescent lights and furnace fires, the maintaining of such bodies at constant color and hence constant temperature and the matching of paints of similar composition.

For purposes of description I have selected the application of my invention to the determination of the color temperature and indirectly the actual temperature of incandescent lights. This is only one of a number of uses as I have said and my invention is by no means limited thereto.

A light source, the integral color of which may be matched with that of a black body at some definite temperature is said to have a color temperature. The color temperature is not the same as the true temperature but the relationship between the color temperature and the true temperature has been thoroughly investigated and is well known. One such light source is an incandescent filament.

The most important factor in determining the efficiency of an incandescent lamp is the temperature of its filament. An accepted criterion for the temperature of the filament is the color of the light emitted by it.

The practice in determining the color temperature of an incandescent filament has heretofore been to match its color with the color of the light of a standard lamp, or, in other words, a standard lamp which has been calibrated so that the color temperature of its filament at a series of voltage is known. In carrying out this method the standard lamp is placed at one end of a photometer bar and the lamp to be tested at the other end with between them a photometer particularly sensitive to color differences. The voltage of the lamp to be measured is varied until the color of its light matches that of the standard lamp, whereupon the color temperature is determined from the calibration curve of the standard lamp. This method is laborious, requires a large number of observations and at best is not sufficiently accurate because the matching of the colors depends upon the imperfect and varying ability of the human eye.

My invention eliminates the human equation to a great extent and determines colors and color temperatures by means of electrical currents and electrical instruments.

By my invention the light from the lamp is caused to pass through a screen or filter more transmissive of the red end of the spectrum than the blue. Behind the filter is a photoelectric cell in which a current is generated by the light passing through the filter. The red filter is then removed and a filter more transmissive of the blue portion of the spectrum than the red is substituted. A current is again generated in the photoelectric cell by the action of the light passing through the blue filter. In all probability this current will be found to be of a different value than the current generated by the red filtered light. If this is the case the degree of incandescence or color of the lamp filament is altered by varying the voltage upon it and the operation is repeated until the two currents are exactly equal.

If a standard lamp calibrated for color temperature is now substituted for the unknown lamp and the same operation repeated, a color temperature for the standard lamp also can be found at which the two currents are equal. Obviously this color temperature will be the same as that of the unknown lamp and its value may be ascertained by noting the voltage on the standard lamp and referring to its calibration curve.

With the single pair of filters above described color balance can be obtained at only a single voltage which may be of one value for the unknown lamp and another for the standard lamp. However, by repeating the process with several pairs of filters having different transmission characteristics several points of color balance can be secured each at some single but different voltage from which a color temperature curve for the unknown lamp can be drawn and its color temperature at any point ascertained.

This describes the general nature of this form of my invention. However, it may be carried out by more efficient apparatus which will now be described with the aid of the accompanying drawings of which Fig. 1 is a diagrammatic illustration of a simple form of apparatus.

Fig. 2 is a diagram of a photoelectric cell and a very simple circuit which may be used.

Fig. 3 is a diagrammatic illustration of a more highly developed and efficient apparatus for the performance of the invention.

Fig. 4 is a diagrammatic illustration of a photoelectric photometer suitable for use with the arrangement of Fig. 3.

Fig. 5 illustrates a device for reversing the direction of the currents through the galvanometer of the circuit of Fig. 4.

Fig. 6 is a plan view of an auxiliary filter having three sections of different tints.

Fig. 7 is a plan view of another auxiliary filter in which the tints are varied by imperceptible degrees from one end to the other.

Fig. 8 is a diagrammatic illustration of a form of apparatus suitable for the matching of pigments or colored surfaces as distinguished from incandescent lamps or other original sources of light. Similar reference numerals indicate like parts in all the figures where they appear.

Referring to Fig. 1 there is shown thereby a simple apparatus for carrying out the invention as already described. The unknown or standard lamp, as the case may be, is shown at 1. The photoelectric photometer is shown at 3. Interposed between the lamp and the photometer is the filter 2, which may be conveniently formed of two sections, one 4 of which is more transmissive of light from the red end of the spectrum and the other 5 of the blue end as already described. A suitable circuit including a source of electrical energy and a means for determining the voltage will of course be provided for the lamp 1. It has not been thought necessary to show this circuit. The photoelectric photometer generally indicated by 3 in Fig. 1 may be of any suitable type. It will of course include an instrument by which the current generated in the photoelectric cell can be accurately measured.

A very simple form of photoelectric photometer is illustrated by Fig. 2 of which 6 is a photoelectric cell, 7 a battery and 8 a galvanometer.

In operation the unknown lamp is brought to incandescence and the light therefrom, passing through one section of filter 2, let us say the red filter 4, falls upon the photoelectric cell 6 of the photometer 3, as a result of which a current is generated in the photoelectric cell, the strength of which is noted by galvanometer 8. Then the red filter 4 is replaced by the blue filter 5. The value of the current in the photometer under these conditions is noted. If the two currents are not equal the voltage on the filament is varied and the operation repeated until they are. This condition will obtain for only a single color temperature of the lamp. Consequently, if a standard lamp previously calibrated for color temperature at various voltages is substituted for the unknown lamp and the same process followed with respect to it until the photometer currents are equal, its color temperature may be learned by noting the voltage on the lamp and reading the equivalent color temperature from the calibration curve. This will also be the color temperature of the unknown lamp at the voltage impressed upon it when the two currents in the photometer have been brought to equality. By substituting other pairs of filters for the original pair 2, color temperatures for other voltages may be obtained in a similar manner and a color temperature curve for the unknown lamp secured.

Greater range may be imparted to any pair of the filters described above by employing in conjunction therewith auxiliary filters such as those shown in Figs. 6 and 7. By inserting such filters between the filter 2 and the photoelectric photometer the apparent color temperature of both the unknown and standard lamp at which the two currents in the photoelectric photometer will be equal can be altered. The selection of such filters may readily be made by those skilled in the art. Their effect is simply to alter the transmission characteristics of the original filters 2 further towards the red or blue end of the spectrum as the case may be. A filter of the form shown in Fig. 6 may for example consist of three sections, one tinted very slightly, a mid-section having a somewhat darker tint and the third section a still darker tint, thereby three rather wide alterations may be imposed upon the transmission characteristics of filters 2. Still greater refinement may be secured by employing in addition the type of filter shown in Fig. 7 in which the tints are varied by imperceptible degrees from one end to the other. This filter may also be positioned between the filter 2 and the photoelectric photometer so that the light from the lamp will pass through it as well as through filters 2 and 9. By this means a most effective control can be had over the transmitted light falling upon the photoelectric cell.

If desired the filters above described may be calibrated with respect to a standard lamp which has been calibrated for color temperature and the standard lamp then eliminated entirely from the operation, the color temperature of the unknown lamp being read directly from a scale associated with filter 10. However, the characteristics of color filters may not be entirely stable and for most accurate results I prefer to employ the standard lamp as above described.

With the arrangements above described manual manipulation of the filters 2 has been assumed. A preferable arrangement is shown in Figs. 3 and 4 wherein these manipulations are eliminated and the details of operation somewhat altered. The underlying principles however remain unchanged.

In the arrangement shown in Fig. 3 the relative positions of the unknown or standard lamp as the case may be, the photoelectric photometer and the filters remain unchanged. Here the standard lamp 12 and the the unknown lamp 13 are shown mounted on a slide 14 which divides the light-tight box 15 into two compartments. A hole 16 is provided in one side of the box. By pushing the slide 14 one way or the other, the light 12 or the light 13 may be brought opposite the hole 16. Separate circuits are shown for each lamp, that of the standard lamp containing a resistance 17, a battery 18 and a voltmeter 19 and that of the unknown lamp containing a resistance 20, a battery 21 and a voltmeter 22.

The box 15 is so positioned that the light from the lamp opposite the hole 16 will be transmitted through the filter 23. This filter corresponds to filter 2 in Fig. 1 but is in the form of a disk mounted upon a shaft 24 suitably connected to an electric motor 25 or other source of power so that it may be rapidly rotated. As already explained the characteristics of this filter are such that one-half 26 will transmit light from the red end of the spectrum more readily than that from the blue whereas the other half 27 has the opposite characteristic.

Suitably mounted behind the filter disk 23 is an auxiliary filter 9 and the other auxiliary filter 10, the latter equipped with a scale 29. The auxiliary filters 9 and 10 are of course directly in line with the hole 16 and filter disk 23 so that the light passing through the hole 16 may also pass through all of the filters.

Also directly in line is the photoelectric cell 30 of the photoelectric photometer generally shown at 31.

In Fig. 4 I illustrate diagrammatically a photoelectric photometer which may be used with the arrangement of Fig. 3. The photoelectric cell 30 is shown suitably connected into the grid circuit of a three-electrode audion 32 which circuit also contains battery 33, resistance 34 and biasing battery 35. In the plate circuit is the usual battery 36 and also the primary of an audio frequency transformer 37, the secondary of which is connected at its ends to contacts 38 and 39 and by a mid-point tap 40 to contact maker 41 through galvanometer 42.

By means of contact maker 41 the direction of current flow through galvanometer 42 may be reversed so that the current through it will be in one direction while the red filter 26 is interposed between the light and the photoelectric cell and in the opposite direction while the blue filter is in a similar operative position.

Any suitable device for thus changing the direction of the currents may be used. One form which I will designate as contactor 44 is illustrated in Fig. 5 wherein the contact maker 41 is fixed and contacts 38 and 39 are movable. By means of a cam 43 contacts 38 and 39 are alternately operated so that the circuit is closed through contacts 38 and 41 for one-half of each revolution of filter disk 23 and through contacts 39 and 41 during the other half of each revolution. Synchronization is easily and positively obtained by mounting cam 43 on shaft 24 which also carries the filter 23. The general position of the contactor is shown at 44 in Fig. 3.

The operation of the arrangements of Figs. 3 and 4 is as follows:—

The unknown lamp is placed in position before the hole 16 of the box 15 and its rated voltage, say 120 volts, impressed upon it. Filter 23 is then rotated. The photoelectric cell will then be exposed to red filtered light and blue filtered light in rapid alternation. This will result in a rapid succession of varying currents in the circuit of the photoelectric cell, in a rapid variation of potential upon the grid of the audion and corresponding variations in the current in the plate circuit of the audion. This will give rise to electromotive forces and currents in the secondary of transformer 37 which, through the action of circuit maker 41, will pass through the galvanometer 42 in one direction while the red sensitive half 26 of filter 23 is interposed between the light and the photoelectric cell and in the opposite direction when the blue sensitive half 27 of the filter is similarly interposed. If one current is stronger than the other the galvanometer 42 will deflect in one direction or the other.

The several sections of filter 9 are now interposed serially between the light and the photoelectric cell until the deflection of galvanometer 42 is reduced as much as possible but is not caused to pass the zero point. Filter 10 is then brought into play and moved until the remaining deflection is eliminated and the galvanometer reads zero indicating that the currents transmitted through the two halves of the filer 23 are equal. A standard lamp is then substituted for the unknown lamp and its voltage adjusted until current balance is restored, the positions of adjustment of filters 9 and 10 remaining unchanged. Then the voltage on the standard lamp is noted by means of voltmeter 19 and by reference to the color temperature calibration curve of that lamp the color temperature of the unknown lamp at its rated voltage ascertained. As a matter of fact voltmeter 19 may itself be calibrated to correspond with the calibration curve of the standard lamp so that the color temperature of the standard lamp may be read directly from the voltmeter without reference to the calibration curve.

By means of auxiliary filters 9 and 10 the range of filter disk 23 may be extended so that it may be used for lamps beyond its range when used alone. In case the photoelectric photometer cannot be made to balance when filter disk 23 alone is employed the insertion of filters 9 and 10, the selection of which can be readily made by those skilled in the art, will increase the transmissiveness of filter 23 to the red rays and decrease its transmissiveness to the blue rays or vice versa so that the photoelectric photometer can be balanced. Furthermore, the filter 10 may be calibrated with respect to filter disk 23 and the standard lamp and the operation simplified, the color temperature being read directly from a scale 29 associated with the filter 10 and the standard lamp being dispensed with.

The adaptability of my invention for determining the color temperature of any incandescent body now becomes apparent. For example, the color temperature and indirectly the actual temperature of a furnace fire may be determined by employing my invention without alteration beyond providing a suitable way of exposing the device to the light of the furnace fire. Furthermore, by combining with my invention means for automatically balancing the currents in the photometer and for recording fluctuations, a curve or record of fluctuations of color temperature may be obtained. They require no description here since in detail they form no part of my invention.

Another field in which my invention is very useful is that of pigments. Pigments having the same composition may be accurately matched by my invention. If light from a suitable source is focused upon a surface coated with the pigment and the reflected light gathered by means of a lens and projected through the filters upon the photoelectric photometer it may be balanced as already described. To determine whether another mix of the pigment is identical in color it is only necessary to substitute a surface coated with the new mix for the original surface. If they are exactly the same in color the photoelectric photometer will again balance without readjustment of the filters, otherwise it will not. In the latter case the mix may be experimented with until its color is the same as that of the old, as indicated by the balancing of the photoelectric photometer without readjustment. My invention is obviously of great value in this field since the difficulty of matching pigment colors exactly by means of the eye is notorious.

Apparatus for utilizing my invention for the purpose just described is diagrammatically illustrated by Fig. 8. It is essentially the same as that illustrated by Fig. 3 and already described, with the exception of the features hereinafter specifically mentioned. The two lamps shown at 12 and 15 in Fig. 3 are replaced by surfaces 45 and 46—one for carrying the pigment or other surface of known color characteristics, and the other for carrying color which is to be matched to the known color. These surfaces 45 and 46 should, of course, be positioned so that light from a suitable lamp 47 will be reflected through the filter disc 23 and the auxiliary filters 9 and 10 if they are used upon the photoelectric cell 30. It is necessary, of course, to prevent the light from lamp 47 from falling directly upon the filters or the photoelectric cell. Therefore it may be enclosed within a suitable light-tight box 48 and the light therefrom projected upon the surfaces 45 or 46, as the case may be, through a tubular extension 53 connecting the lamp enclosure 48 with the light-tight box 15. Within the tubular extension 53 there is preferably mounted a lens 52 to focus the light from lamp 47 upon the surface 45 or 46. Lamp 47 is illustrated as an incandescent lamp, although it may be any other suitable source of illumination. As illustrated it is provided with a circuit, including a battery or other source of electrical energy 50, a variable resistance 49, and a voltmeter 51. The operation of this form of my invention will be readily understood from the description already given. There is no difference in principle and very little in detail, surfaces 45 and 46 having been substituted for lamps and a source of light provided for illuminating the surfaces sufficiently to produce reflected light of adequate strength and properly directed to fall upon and influence the photoelectric cell.

Another outstanding advantage of my invention resides in the fact that the intensity of the light projected upon the photoelectric cell as distinguished from its color has no reflection in the result. In optical methods of color matching any material difference in the intensity of the color makes accurate comparison extremely difficult, if not impossible.

The foregoing description which by no means covers the possible uses of my invention will suffice to illustrate its underlying principles and a way in which it may be utilized. It will be seen that my invention comprises a method and means whereby the color of an incandescent body of a body capable of transmitting or reflecting light may be accurately determined by means of electrical currents as distinguished from the hazardous method of attempting such determinations through the agency of the human eye.

I claim:—

1. The method of matching the color of a luminous body to that of a luminous body of known color characteristics which consists in varying the color of the light projected by the body upon a photoelectric cell alternately through a filter more transmissive of red rays than of blue and a filter having the opposite characteristic until the red filtered light produces the same effect upon the photoelectric cell as the blue filtered light, substituting for the body a body of known color characteristics, projecting the light therefrom upon the photoelectric cell alternately through the red filter and the blue filter and varying its color until the effect upon the photoelectric cell of the red filtered light is the same as the effect of the blue filtered light.

2. The method of matching the color of a luminous body to that of a luminous body of known color characteristics by causing its light to be projected upon a photoelectric cell after passing alternately through a red and blue filter, altering the transmission characteristics of said filters until the effect of the red filtered light upon the photoelectric cell is the same as the effect of the blue filtered light, replacing the body by a body of known color characteristics, varying the color of the light of the known body until the effects of the red and blue filtered light upon the photoelectric cell are the same, thus matching the colors of the known and unknown bodies.

3. A device for matching the color of a luminous body to that of a luminous body of known color characteristics comprising means for varying the color of the light from said body, means for varying the color of the light from a body of known color characteristics, a filter in the form of a disk, one-half of which is more transmissive of red light than of blue, the other half of which has the opposite characteristic, means for rotating said disk, a photoelectric cell so positioned that the light from the body will fall upon it after passing through the filter and a circuit associated with the photoelectric cell for determining when the effect upon it of the red filtered light equals the effect of the blue filtered light.

4. A device for matching the color of a luminous body to that of a luminous body of known color characteristics comprising means for varying the color of the light from said body, means for varying the color of the light from a body of known color characteristics, a filter in the form of a disk, one-half of which is more transmissive of red light than of blue, the other half of which has the opposite characteristic, means for rotating said disk, a photoelectric cell so positioned that the light from the body will fall upon it after passing through the filter and a circuit associated with the photoelectric cell for determining when the effect upon it of the red filtered light equals the effect of the blue filtered light and auxiliary filters whereby the mean characteristic of the light transmitted by the red and blue filters may be altered towards either end of the spectrum.

5. The method of determining the color temperature of an incandescent filament which consists of varying the color of the filament until the color of the light projected upon a photoelectric cell alternately through a filter more transmissive of red rays than of blue and a filter of opposite characteristic produces the same effect upon the photoelectric cell, substituting for the original filament a filament of known color temperature characteristics, repeating the process with this filament, thus matching the color and by comparison determining the color temperature of the original filament.

6. The method of determining the color temperature of an incandescent filament by impressing a desired voltage upon it, causing its light to be projected upon a photoelectric cell after passing alternately through a red and a blue filter, altering the transmission characteristics of said filters until the effect of the red filtered light upon the photoelectric cell is the same as the effect of the blue filtered light, replacing the filament by a filament calibrated for color temperature, varying the voltage on the calibrated filament until the effects of the red and blue filtered light upon the photoelectric cell are the same and determining the color temperature of the original filament by comparison with the known color temperature of the calibrated filament.

7. A device for determining the color temperature of an incandescent filament comprising a circuit including a source of electrical energy and the filament, means for regulating voltage upon said filament, a second circuit including a source of electrical energy and a filament calibrated for color temperature, means for regulating the voltage upon the filament calibrated for color temperature, a filter in the form of a disk, one-half of which is more transmissive of red light than of the blue, the other half of which has the opposite characteristic, means for rotating said disk, a photoelectric cell so positioned that the light from either filament may fall upon it after passing through the filter and a circuit associated with the photoelectric cell for determining when the effect upon it of the red filtered light equals the effect of the blue filtered light.

8. A device for determining the color temperature of an incandescent filament comprising a circuit including a source of energy and the filament, means for regulating the voltage upon said filament, a second circuit including a source of energy and a filament calibrated for color temperature, means for regulating the voltage upon the filament calibrated for color temperature, a filter in the form of a disk, one-half of which is more transmissive of red light than of blue, the other half of which has the opposite characteristic, means for rotating said disk, a photoelectric cell so positioned that the light from the filament will fall upon it after passing through the filter and a circuit associated with the photoelectric cell for determining when the effect upon it of the red filtered light equals the effect of the blue filtered light and auxiliary filters positioned between the incandescent filament and the photoelectric cell whereby the mean characteristic of the light transmitted by the red and blue filters may be altered towards either end of the spectrum as desired.

9. The method of matching the color of a luminous body to that of a body of known color characteristics which comprises alternately projecting upon a photoelectric cell those light waves from the opposite halves of the spectrum of the luminous body of known color characteristics which will produce equal electrical currents in the photoelectric cell circuit, substituting for said luminous body the luminous body whose color is to be matched to the body of known color characteristics, alternately projecting light waves from opposite halves of its spectrum upon the photoelectric cell and altering the color of said body until the light waves thus projected also produce in the photoelectric cell circuit two equal currents.

CLAYTON H. SHARP.